(12) United States Patent
Yu et al.

(10) Patent No.: US 6,396,689 B1
(45) Date of Patent: May 28, 2002

(54) COMPUTER MAINFRAME COOLING STRUCTURE

(75) Inventors: Ming-Chuan Yu, 16F-6, No. 1071, Chung Cheng Road, Taoyuan; Chung Che Yu, Taipei Hsien, both of (TW)

(73) Assignee: Ming-Chuan Yu (TW)

( * ) Notice: Subject to any disclaimer, the term of this patent is extended or adjusted under 35 U.S.C. 154(b) by 31 days.

(21) Appl. No.: 09/631,649

(22) Filed: Aug. 2, 2000

(51) Int. Cl.[7] .................................................. G06F 1/20
(52) U.S. Cl. ...................... 361/687; 361/683; 361/684; 361/685; 361/686; 439/894
(58) Field of Search ................................. 361/683–695; 439/61, 296–298, 487, 894; 340/635, 584; 454/184

(56) References Cited

U.S. PATENT DOCUMENTS 5,673,029 A * 9/1997 Behl et al. .................. 340/635
6,213,819 B1 * 4/2001 Fan ............................. 439/894

* cited by examiner

Primary Examiner—Darren Schuberg
Assistant Examiner—Yean-Hsi Chang
(74) Attorney, Agent, or Firm—Troxell Law Office PLLC

(57) ABSTRACT

A computer mainframe cooling structure includes a mounting plate adapted for fastening to the bottom side wall of a hard diskdrive in a computer mainframe, the mounting plate having at least one suction hole and a plurality of retaining holes spaced around the at least one suction hole, and at least one fan holder shell respectively fastened to the mounting plate around to hold a respective fan corresponding to the at least one suction hole for quick dissipation of heat from the hard diskdrive, the at least one fan holder shell each having a plurality of retaining hooks respectively fastened to the retaining holes of the mounting plate.

3 Claims, 5 Drawing Sheets

COMPUTER MAINFRAME COOLING STRUCTURE

BACKGROUND OF THE INVENTION

The present invention relates to a computer mainframe cooling structure, and more particularly to such a computer mainframe cooling structure, which effectively carries heat away from the hard diskdrive, and well protects the hard diskdrive against dust.

Regular personal computers are commonly equipped with a fan for dissipation of heat from the hard diskdrive. In order to hold a fan in the hard diskdrive, a fan holder case or rack shall be used. According to conventional designs, a hard diskdrive has a limited space sufficient for the mounting of one fan only. Further, when the fan fails or is burned out, it is difficult to dismount the fan holder case or rack.

SUMMARY OF THE INVENTION

The invention has been accomplished under the circumstances in view. It is one object of the present invention to provide a computer mainframe cooling structure, which is detachable. It is another object of the present invention to provide a computer mainframe cooling structure, which requires less installation space. It is still another object of the present invention to provide a computer mainframe cooling structure, which protects the hard diskdrive against dust, and prevents the occurrence of static electricity in the hard diskdrive. To achieve these and other objects of the present invention, there is provided a computer mainframe cooling structure, which comprises a mounting plate adapted for fastening to the bottom side wall of a hard diskdrive in a computer mainframe, and at least one fan holder shell respectively fastened to the mounting plate around to hold a respective fan corresponding to the at least one suction hole for quick dissipation of heat from the hard diskdrive. The mounting plate comprises at least one suction hole, and a plurality of retaining holes spaced around the at least one suction hole. The at least one fan holder shell each comprised a plurality of retaining hooks respectively fastened to the retaining holes of the mounting plate.

DETAILED DESCRIPTION OF THE PREFERRED EMBODIMENT

Figure 1:
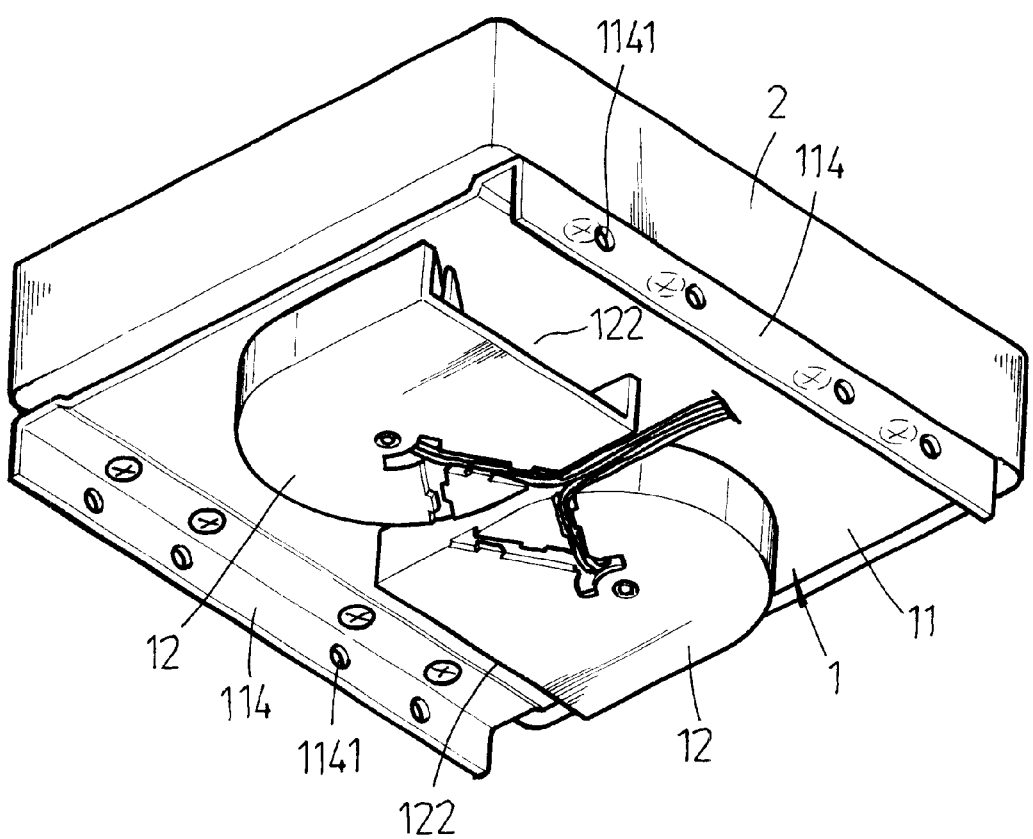
FIG. 1 is a perspective view showing a computer mainframe cooling structure fastened to a hard diskdrive according to the present invention.
Figure 2:
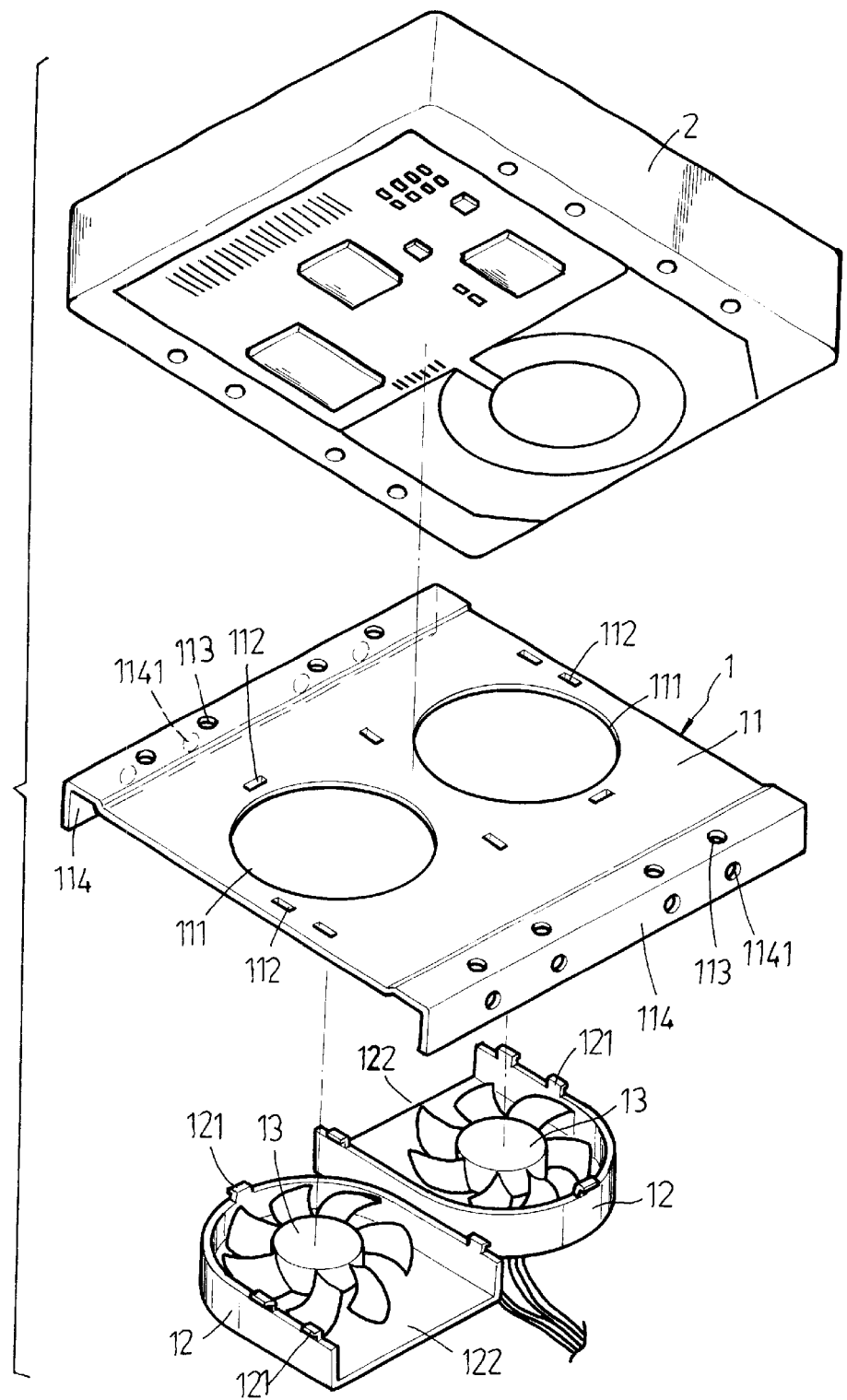
FIG. 2 is an exploded of the assembly of FIG. 1.
Figure 3:
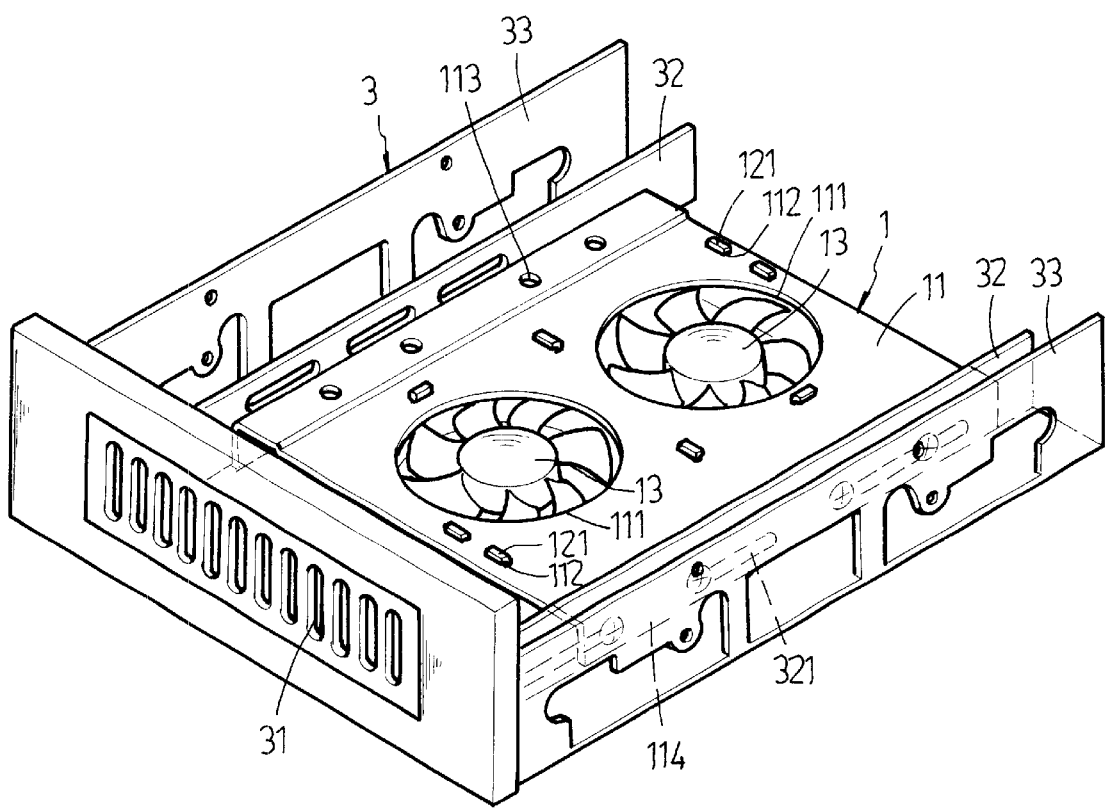
FIG. 3 is a perspective view showing the computer mainframe cooling structure fastened to a mobile rack according to the present invention.
Figure 4:
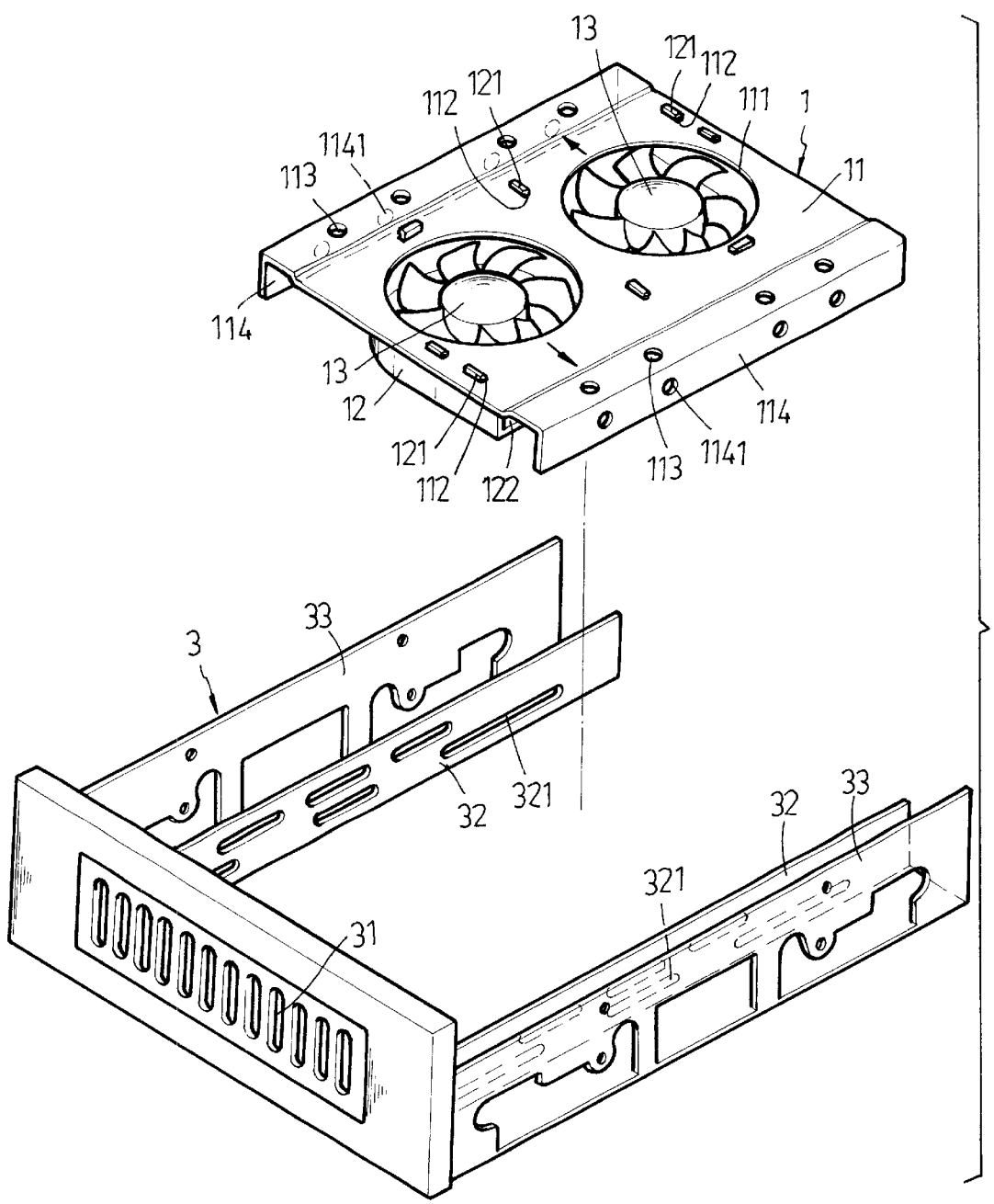
FIG. 4 is an exploded view of the assembly of FIG. 3.
Figure 5:
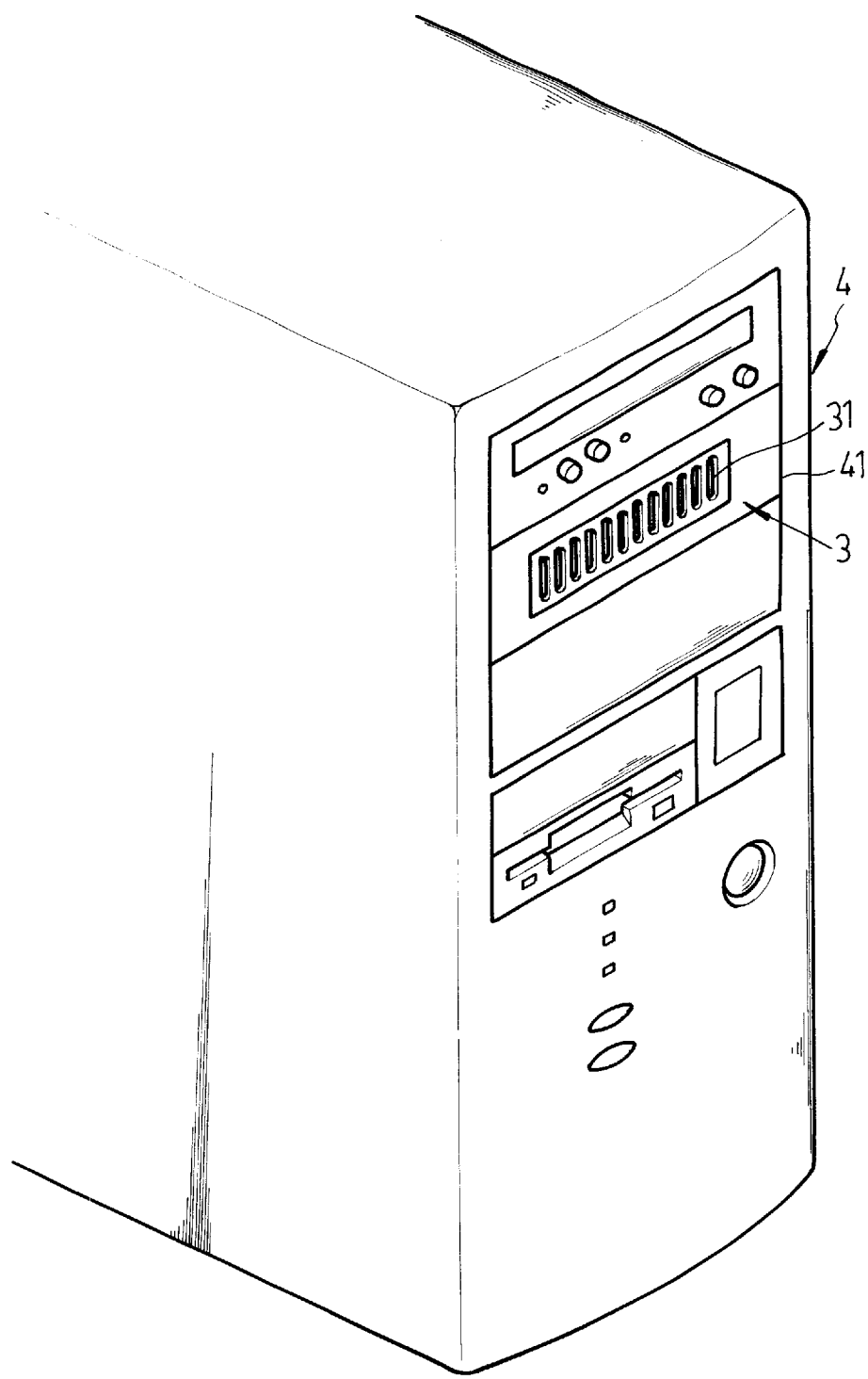
FIG. 5 illustrates the assembly of FIG. 3 installed in a hard diskdrive slot in a computer mainframe according to the present invention.

Referring to FIGS. 1 and 2, a computer mainframe cooling structure 1 comprises a mounting plate 11, at least one, for example two fan holder shells 12, and equal number of fans 13 respectively installed in the fan holder shells 12.

The mounting plate 11 comprises a plurality of suction holes 111 corresponding to the fans 13 in the fan holder shells 12, a plurality of mounting holes 113 adapted for fastening to the bottom side of a hard diskdrive 2 by fastening elements, and a plurality of retaining holes 112 respectively spaced around each suction hole 111. The fan holder shells 12 hold a respective fan 13, each having a plurality of mounting hooks 121 respectively fastened to the retaining holes 112 of the mounting plate 11, and an air output port 122 at one side of output of air. After installation of the computer mainframe cooling structure 1 in the hard diskdrive 2 at the bottom side, the computer mainframe cooling structure 1 protects the hard diskdrive 2 against dust, and prevents the occurrence of static electricity in the hard diskdrive 2. When the fans 13 are started, currents of air are produced to carry heat away from the hard diskdrive 2.

Referring to FIGS. from 3 through 5 and FIG. 2 again, the computer mainframe cooling structure 1 can also be used with a mobile rack 3 for installation in a hard diskdrive slot 41 in a computer mainframe 4. The mounting plate 11 comprises two mounting flanges 114 perpendicularly disposed at two sides and arranged in parallel, each mounting flange 114 having a plurality of tie holes 1141 adapted for fastening to the mobile rack 3. The mobile rack 3 comprises a plurality of air vents 31 in the transverse front side wall thereof, two outer side walls 33 perpendicularly backwardly extended from the transverse front side wall and arranged in parallel, and two inner side walls 32 perpendicularly backwardly extended from the transverse front side wall and spaced between the outer side walls 33. The inner side walls 32 each have a plurality of elongated mounting slots 321. The computer mainframe cooling structure 1 is mounted in the mobile rack 3 between the inner side walls 32, enabling the tie holes 1141 of the mounting flanges 114 to be respectively fastened to the elongated mounting slots 321 of the inner side walls 32 of the mobile rack 3 by screws. When assembled, the mobile rack 3 with the computer mainframe cooling structure 1 are inserted into the hard diskdrive slot 41 of the computer mainframe 4. During the operation of the computer, heat is quickly carried away from the hard diskdrive into the outside air through the air vents 31 of the mobile rack 3.

It is to be understood that the drawings are designed for purposes of illustration only, and are not intended for use as a definition of the limits and scope of the invention disclosed.

What the invention claimed is:

1. A computer mainframe cooling structure comprising:

a mounting plate, said mounting plate comprising at least one suction hole, and a plurality of retaining holes spaced around said at least one suction hole;

at least one fan holder shell respectively fastened to said mounting plate to hold a fan corresponding to said at least one suction hole, said at least one fan holder shell each comprising a plurality of retaining hooks respectively fastened to the retaining holes of said mounting plate;

a mobile rack adapted to hold said mounting plate and a hard diskdrive above said mounting plate in a hard diskdrive slot in a computer mainframe, said mobile rack including a plurality of air vents in a transverse front side wall thereof, two outer side walls perpendicularly extending from said transverse front side wall and arranged in parallel for the mounting of the hard diskdrive, and two inner side walls perpendicularly extending from said transverse front side wall and spaced between said outer side walls for the mounting of said mounting plate, said inner side walls each having a plurality of elongated mounting slots respectively and fastened to said mounting plate.

2. The computer mainframe cooling structure of claim 1 wherein said mounting plate comprises a plurality of mounting holes adapted for fastening to a bottom side wall of the hard diskdrive by screws.

3. The computer mainframe cooling structure of claim 1 wherein said mounting plate comprises two mounting flanges perpendicularly disposed at two sides and adapted for fastening to a mobile rack, said mounting flanges each having a plurality of tie holes for mounting.

* * * * *